United States Patent
Wei

(10) Patent No.: US 8,929,555 B2
(45) Date of Patent: Jan. 6, 2015

(54) DATA ENCRYPTION SYSTEMS AND METHODS

(75) Inventor: Bo-Er Wei, Taipei (TW)

(73) Assignee: Transpacific IP I Ltd., Taipei (TW)

( * ) Notice: Subject to any disclaimer, the term of this patent is extended or adjusted under 35 U.S.C. 154(b) by 2610 days.

(21) Appl. No.: 10/997,357

(22) Filed: Nov. 23, 2004

(65) Prior Publication Data

US 2006/0064584 A1 Mar. 23, 2006

(30) Foreign Application Priority Data

Sep. 22, 2004 (TW) .............................. 93128681 A

(51) Int. Cl.
*G06F 12/14* (2006.01)
*G06F 21/10* (2013.01)
*H04L 9/08* (2006.01)

(52) U.S. Cl.
USPC .......................................... 380/284; 713/165

(58) Field of Classification Search
USPC .......................................... 713/165; 380/284
See application file for complete search history.

(56) References Cited

U.S. PATENT DOCUMENTS

| | | | |
|---|---|---|---|
| 6,477,252 B1 | 11/2002 | Faber et al. | |
| 6,810,387 B1 * | 10/2004 | Yim | 705/57 |
| 6,836,483 B1 * | 12/2004 | Lee | 370/395.31 |
| 7,533,275 B2 * | 5/2009 | Nakano | 713/193 |
| 2003/0163737 A1 * | 8/2003 | Roskind | 713/201 |
| 2005/0097332 A1 * | 5/2005 | Imai | 713/176 |
| 2005/0208891 A1 * | 9/2005 | Khare et al. | 455/39 |

FOREIGN PATENT DOCUMENTS

CN 1282161 1/2001

OTHER PUBLICATIONS

Office Action, mailed Feb. 6, 2009, for Chinese Patent Application No. 2004100865489.
Office Action, mailed Jul. 31, 2009, for Chinese Patent Application No. 2004100865489.
Office Action, issued on Jan. 29, 2010, for Chinese Patent Application 2004100865489.

* cited by examiner

*Primary Examiner* — Kambiz Zand
*Assistant Examiner* — Aubrey Wyszynski
(74) *Attorney, Agent, or Firm* — Schwabe, Williamson & Wyatt, P.C.

(57) ABSTRACT

Data encryption systems and methods. The system includes a storage device storing data and an encryption/decryption module. The encryption/decryption module randomly generates a device key seed according to the occurrence time of a specific operation or the interval between two specific operations on the storage device, and applies the device key seed to data encryption.

23 Claims, 2 Drawing Sheets

DATA ENCRYPTION SYSTEMS AND METHODS

BACKGROUND

The present disclosure relates generally to data protection mechanisms, and, more particularly, to data encryption systems and methods.

Computers can be used to remotely authenticate and authorize digital data. Network applications are also convenient, but data protection is critical.

Conventionally, data, such as authentication data can be protected using a hardware or software based fixed or non-fixed key encryption. Authentication data, for example, can be encrypted according to public key cryptography before transmission to a service provider. Upon reception of the encrypted data, the service provider decrypts the encrypted data to obtain the authentication data, and authorize a user.

If the encryption is hardware based, additional device cost is incurred. Additionally, the authentication data is always stored in a portable device. The design of the device will become complicated due to the size limitations. If the encryption employs a fixed key, the same authentication data may result in the same encrypted data. That is, the storage device storing the authentication data can be easily imitated by a simulator or by sniffing and re-transmitting the encrypted data. If the encryption employs a non-fixed key, the non-fixed key is generated by searching for a key in a database. The database storing the file is still at risk. Further, in non-fixed key encryption, the key must be distributed to both connected sides and the key may be sniffed during transmission.

SUMMARY

Data encryption systems and methods are provided. In an exemplary embodiment of a data encryption system, the system comprises a storage device comprising data D and an encryption/decryption module. The encryption/decryption module randomly generates a device key seed $S_d$ according to the time of a specific operation or the interval between two specific operations on the storage device, and applies the device key seed $S_d$ and a seed generated by a host to data encryption.

An embodiment of the system further comprises a host to receive the device key seed $S_d$ from the storage device. The host generates a host key seed $S_h$, generates a first key $K_n$ according to the device key seed $S_d$, encrypts the host key seed $S_h$ using the first key $K_n$, and transmits the encrypted host key seed $K_n(S_h)$ to the storage device. The storage device generates the first key $K_n$ according to the device key seed $S_d$, and decrypts the encrypted host key seed $K_n(S_h)$ using the first key $K_n$ to obtain the host key seed $S_h$. The storage device further generates a second key $K_{n+1}$ according to the host key seed $S_h$ and the device key seed $S_d$, and encrypts the data D using the second key $K_{n+1}$.

The host further receives the encrypted data $K_{n+1}(D)$, generates the second key $K_{n+1}$ according to the host key seed $S_h$ and the device key seed $S_d$, and decrypts the encrypted data $K_{n+1}(D)$ using the second key $K_{n+1}$ to obtain the data D.

The specific operation is received on the storage device, and corresponds to a control transmission or normal data transmission defined by USB (Universal Serial Bus). The control transmission comprises status getting, feature clearing, feature setting, address setting, descriptor getting, descriptor setting, configuration getting, configuration setting, interface getting, interface setting, or frame synchronization.

The host key seed is randomly generated and difficult to be predicted and amended. The generation method for the host key seed, however, is not limited. The system generates the host key seed according to the operation capability of the host. In some embodiments, the system generates the host key seed using a complex algorithm requiring higher operational requirement, or according to the interval between the execution of an application and the reception of the device key seed with less operational requirements.

In an exemplary embodiment of a data encryption method, a device key seed $S_d$ is randomly generated according to the time of a specific operation or the interval between two specific operations on the storage device. The device key seed $S_d$ is applied to data encryption on a storage device.

The device key seed $S_d$ is further transmitted from the storage device to a host. In the host, a host key seed $S_h$ is generated, a first key $K_n$ is generated according to the device key seed $S_d$, the host key seed $S_h$ is encrypted using the first key $K_n$, and the encrypted host key seed $K_n(S_h)$ is transmitted to the storage device. After reception of the encrypted host key seed $K_n(S_h)$, the storage device generates the first key $K_n$ according to the device key seed $S_d$, and decrypts the encrypted host key seed $K_n(S_h)$ using the first key $K_n$ to obtain the host key seed $S_h$. The storage device then generates a second key $K_{n+1}$ according to the host key seed $S_h$ and the device key seed $S_d$, and encrypts the data D using the second key $K_{n+1}$.

The encrypted data $K_{n+1}(D)$ is further transmitted from the storage device to the host. The host generates the second key $K_{n+1}$ according to the host key seed $S_h$ and the device key seed $S_d$, and decrypts the encrypted data $K_{n+1}(D)$ using the second key $K_{n+1}$ to obtain the data D.

The specific operation is received on the storage device, and corresponds to a control transmission or normal data transmission defined by USB. The control transmission comprises status getting, feature clearing, feature setting, address setting, descriptor getting, descriptor setting, configuration getting, configuration setting, interface getting, interface setting, or frame synchronization.

The host key seed is randomly generated and difficult to be predicted and amended. The generation method for the host key seed, however, is not limited. The system generates the host key seed according to the operation capability of the host. In some embodiments, the system generates the host key seed using a complex algorithm requiring higher operational requirements, or according to the interval between the execution of an application and the reception of the device key seed with less operational requirements.

Data encryption methods may take the form of program code embodied in a tangible media. When the program code is loaded into and executed by a machine, the machine becomes an apparatus for practicing the disclosed method.

DESCRIPTION OF THE DRAWINGS

Data encryption systems and methods will become more fully understood by referring to the following detailed description with reference to the accompanying drawings, wherein.

DESCRIPTION

Figure 1:
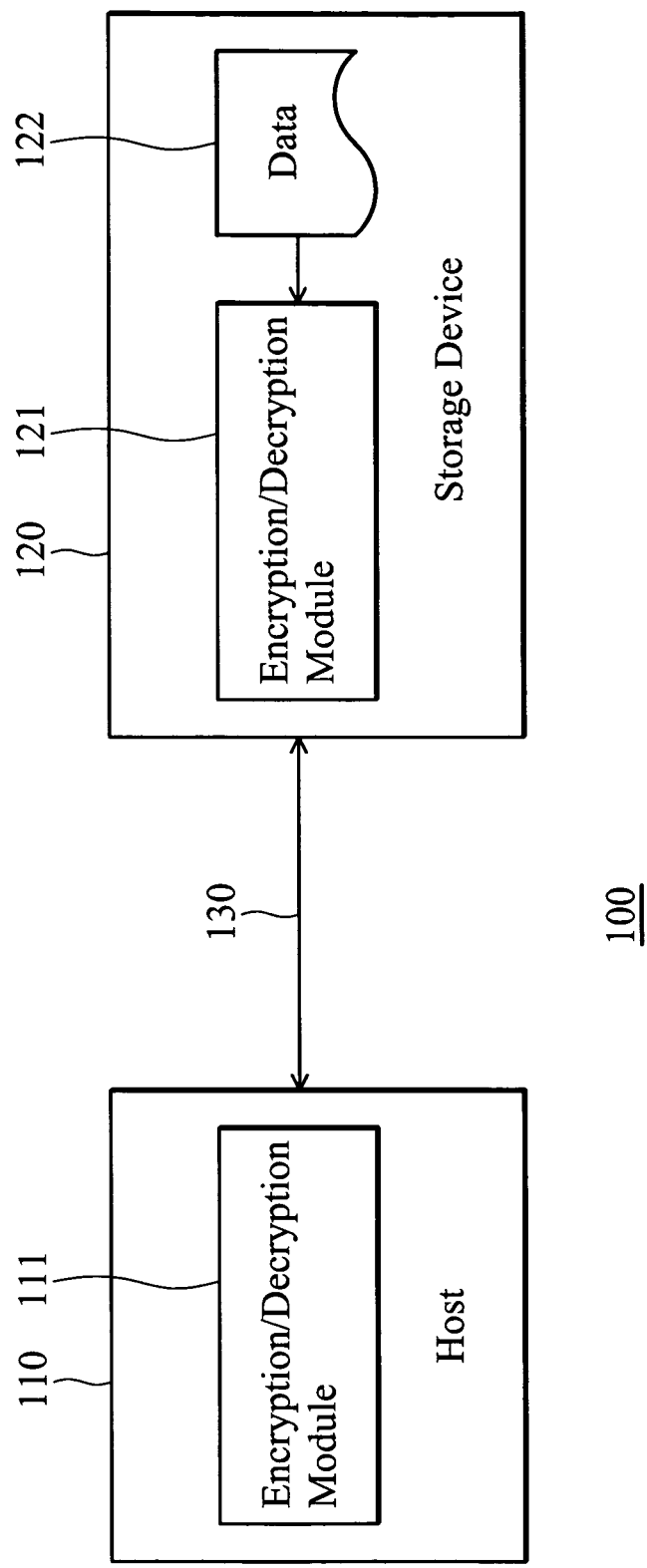
FIG. 1 is a schematic diagram illustrating an embodiment of a data encryption system.

Data encryption systems and methods are provided. FIG. 1 is a schematic diagram illustrating an embodiment of a data encryption system.

An embodiment of the data encryption system 100 comprises a host 110 and a storage device 120. The storage device 120 connects to the host 110 via a channel 130, such as a USB (Universal Serial Bus) transmission channel. The host 110 may be a computer system, an electronic schoolbag, a mobile device, such as a PDA, or other processor-based electronic devices. The host 110 comprises an encryption/decryption module 111, for generating host key seeds and keys, and performing encryption and decryption operations. The storage device 120 may be a mobile device, such as a mobile phone, USB handy disk, or a language learning machine. The storage device 120 comprises an encryption/decryption module 121, and data 122 requiring protection during transmission, such as authentication data for digital copyright control. The encryption/decryption module 121 may be implemented in software or hardware. To reduce cost, a software implementation may be the best choice. Similarly, the encryption/decryption module 121 generates device key seeds and keys, and performing encryption and decryption operations on the data 122.

Figure 2:
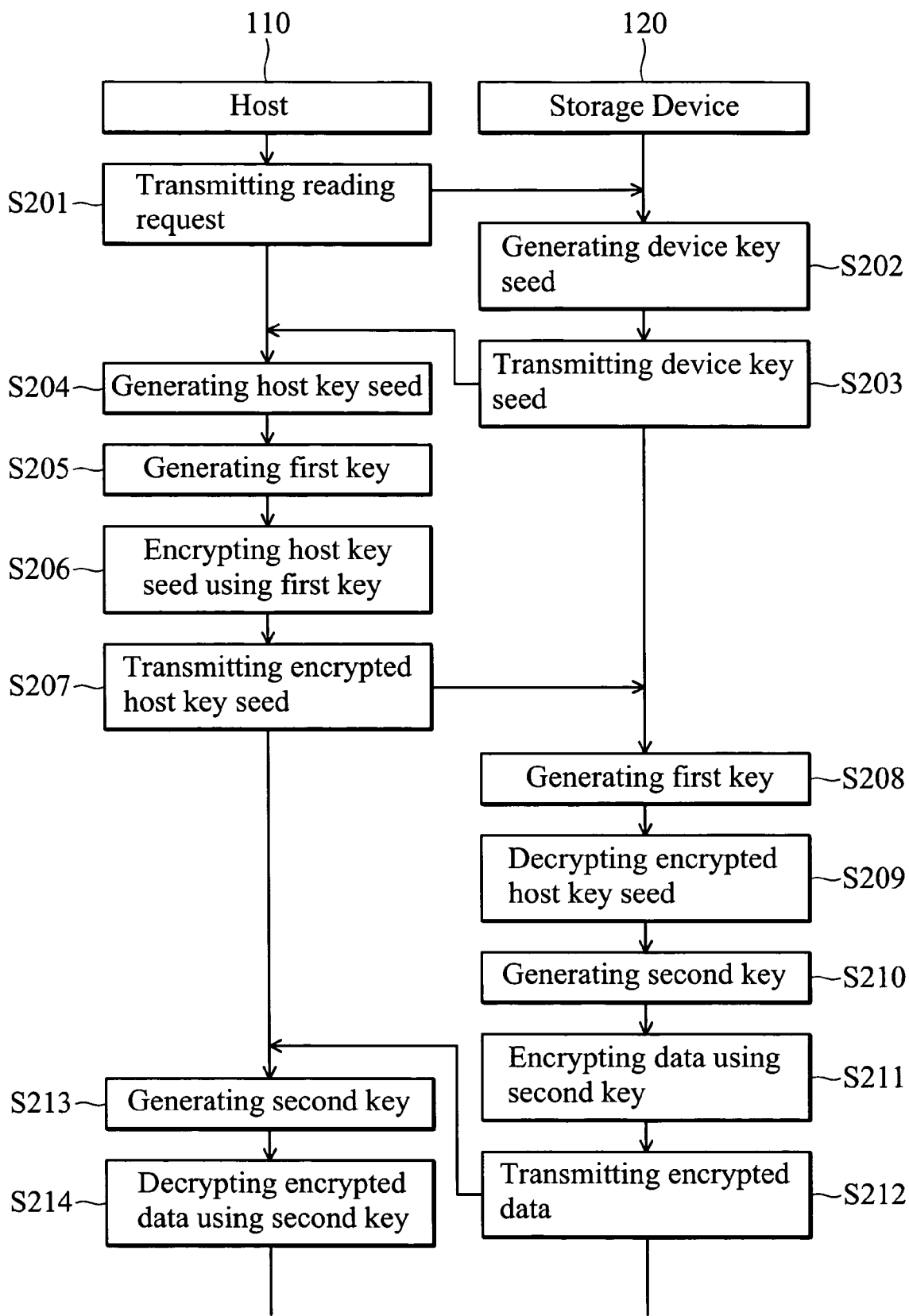
FIG. 2 is a flowchart showing an embodiment of a data encryption method.

FIG. 2 is a flowchart showing an embodiment of a data encryption method.

When an application (not shown in FIG. 1) executes on the host 110 and must read data 122 from the storage device 120, in step S201, the host 110 transmits a read data request to the storage device 120. When the storage device 120 receives the request, in step S202, a device key seed $S_d$ is randomly generated according to the time of a specific operation or the interval between two specific operations on the storage device 120, and in step S203, the device key seed $S_d$ is transmitted to the host 110. It is understood that if the device key seed $S_d$ is generated according to the interval between two specific operations, the two operations may be of different type.

The interval can be measured using the MCU (Micro Control Unit) tick number of the storage device 120. The specific operation is received on the storage device 120 from the host 110, and corresponds to a control transmission defined by USB. The control transmission comprises status getting, feature clearing, feature setting, address setting, descriptor getting, descriptor setting, configuration getting, configuration setting, interface getting, interface setting, or frame synchronization. The descriptors comprise device, configuration, interface, endpoint, and string descriptors. Additionally, the specific operation may be received on the storage device 120 from the host 110, and correspond to a normal data transmission defined by USB. For example, if a FIFO queue of the host 110 is 64 bytes, and each transmission with 64 bytes triggers a USB data transmission. If the host 110 transmits 198 bytes of data, the storage device 120 receives three USB data transmissions each of 64 bytes, and one USB data transmissions of 6 bytes. Each of the four USB data transmissions can be candidates for the specific operations. When each of the operations occurs, an interrupt is triggered to notify the MCU of the storage device 120 regarding the requirement of the operation, and the storage device 120 can obtain the system clock wherein the operation occurred.

After the host 110 receives the device key seed $S_d$, in step S204, a host key seed $S_h$ is generated. It is understood that the host key seed $S_h$ is randomly generated and difficult to be predicted and amended. The generation method for the host key seed $S_h$, however, is not limited. The host 110 generates the host key seed $S_h$ according to the operation capability of the host 110. In some embodiments, the host 110 generates the host key seed $S_h$ using a complex algorithm, or according to the interval between the execution of the application and the reception of the device key seed $S_d$. Then, in step S205, the host 110 generates a first key $K_n$ according to the device key seed $S_d$, in step S206, encrypts the host key seed $S_h$ using the first key $K_n$, and in step S207, transmits the encrypted host key seed $K_n(S_h)$ to the storage device 120.

It is understood that a key seed can be performed with a predetermined number of operations, to thus generate the key for software encryption. The predetermined operations are dependent on different software encryptions. For example, if both the host key seed $S_h$ and the device key seed $S_d$ are 32 bits, a key with 8m bits is generated using following equation (in program language C):

$$F(S_h,S_d)=(S_h*S_d)\&0\text{xff}+((S_h<<8)*S_d)\&0\text{xff00}+\\((S_h<<16)*S_d)\&0\text{xff0000}+((S_h<<24)*S_d)\\\&0\text{xff000000}+((S_h+S_d)\&0\text{xff}+((S_d<<8)*S_h)\\\&0\text{xff00}+((S_d<<16)*S_h)\&0\text{xff0000}+(S_d<<24)*S_h)\\\&0\text{xff000000})<<32.$$

m is an integer within 1 to 8. That is, the key is the last 8m bits of $F(S_h, S_d)$. Additionally, if any of $S_h$ and $S_d$ is not present, the absentee can be replaced by a predefined constant C with 32 bits. The above equation is one example, the method for generating the key is not limited thereto.

The encryption mechanism can be any symmetric encryption, and the complexity and security level of a software encryption method can be selected according to hardware and security requirements. For example, the encryption can be performed by left rotating r bits of authentication data. The value of r is determined according to $K_n$ %64 ($K_n$ is a key generated using $F(S_h, S_d)$ in the n-th transmission). In some embodiments, TEA (Tiny Encryption Algorithm) can be employed. In TEA, a key with 32 bits is obtained from the last 32 bits of $F(S_h, S_d)$. Similarly, the above encryption mechanisms are not limited thereto.

After reception of the encrypted host key seed $K_n(S_h)$, in step S208, the storage device 120 generates the first key $K_n$ according to the device key seed $S_d$, and in step S209, decrypts the encrypted host key seed $K_n(S_h)$ using the first key $K_n$ to obtain the host key seed $S_h$. Then, in step S210, the storage device 120 generates a second key $K_{n+1}$ according to the host key seed $S_h$ and the device key seed $S_d$, in step S211, encrypts the data D using the second key $K_{n+1}$, and in step S212, transmits the encrypted data $K_{n+1}(D)$ to the host 110.

After reception of the encrypted data $K_{n+1}(D)$, in step S213, the host 110 generates the second key $K_{n+1}$ according to the host key seed $S_h$ and the device key seed $S_d$, and in step S214, decrypts the encrypted data $K_{n+1}(D)$ using the second key $K_{n+1}$ to obtain the data D. The data D can be transmitted to the application for further processing, such as authentication.

Data encryption methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data encryption system, comprising:
a storage device adapted to store data D, the storage device including:
an encryption/decryption module adapted to randomly generate a device key seed $S_d$ according to a time interval between two specific operations on the storage device, and adapted to apply the generated device key seed $S_d$ to data encryption of the data D,
wherein the storage device is adapted to randomly generate the device key seed $S_d$ in response to interrupts that notify the storage device of occurrence of the two specific operations.

2. The system of claim 1, further comprising:
a host adapted to receive the generated device key seed $S_d$ from the storage device, to generate a host key seed $S_h$, to generate a first key $K_n$ according to the received device key seed $S_d$, to encrypt the generated host key seed $S_h$ using the generated first key $K_n$, and to transmit the encrypted host key seed $K_n(S_h)$ to the storage device,
wherein the storage device is further adapted to generate the first key $K_n$ according to the device key seed $S_d$, to decrypt the transmitted encrypted host key seed $K_n(S_h)$ using the generated first key $K_n$ to obtain the host key seed $S_h$, to generate a second key $K_{n+1}$ according to the obtained host key seed $S_h$ and the device key seed $S_d$, and to encrypt the data D using the generated second key $K_{n+1}$.

3. The system of claim 2 wherein the host is further adapted to receive the encrypted data $K_{n+1}(D)$ from the storage device, to generate the second key $K_{n+1}$ according to the host key seed $S_h$ and the device key seed $S_d$, and to decrypt the encrypted data $K_{n+1}(D)$ using the generated second key $K_{1+1}$ to obtain the data D.

4. The system of claim 1 wherein one of the specific operations is received on the storage device, and corresponds to a control transmission defined by USB (Universal Serial Bus).

5. The system of claim 4 wherein the control transmission includes at least one of status getting, feature clearing, feature setting, address setting, descriptor getting, descriptor setting, configuration getting, configuration setting, interface getting, interface setting, or frame synchronization.

6. The system of claim 1 wherein one of the specific operations is received on the storage device, and corresponds to a normal data transmission defined by USB (Universal Serial Bus).

7. A data encryption method, comprising:
randomly generating a device key seed $S_d$ according a time interval between two specific operations on a storage device; and
applying the generated device key seed $S_d$ to data encryption of data D,
wherein the device key seed $S_d$ is said randomly generated in response to interrupts that notify the storage device of occurrence of the two specific operations.

8. The method of claim 7, further comprising:
transmitting by the storage device the generated device key seed $S_d$ to a host;
receiving by the storage device from the host an encrypted host key seed $K_n(S_h)$, wherein $S_h$ is a host key seed generated by the host and $K_n$ is a first key generated by the host according to the device key seed $S_d$ transmitted by the storage device;
generating by the storage device the first key $K_n$ according to the device key seed $S_d$;
decrypting by the storage device the received encrypted host key seed $K_n(S_h)$ using the generated first key $K_n$ to obtain the host key seed $S_h$;
generating by the storage device a second key $K_{n+1}$ according to the obtained host key seed $S_h$ and the device key seed $S_d$; and
encrypting by the storage device the data D using the generated second key $K_{n+1}$.

9. The method of claim 8, further comprising:
transmitting by the storage device the encrypted data $K_{n+1}(D)$ to the host so as to enable the host to:
generate the second key $K_{n+1}$ according to the host key seed $S_h$ and the device key seed $S_d$ in the host; and
decrypt the encrypted data $K_{n+1}(D)$ using the generated second key $K_{1+1}$ to obtain the data D.

10. The method of claim 7 wherein one of the specific operations is received on the storage device, and corresponds to a control transmission defined by USB (Universal Serial Bus).

11. The method of claim 10 wherein the control transmission includes at least one of status getting, feature clearing, feature setting, address setting, descriptor getting, descriptor setting, configuration getting, configuration setting, interface getting, interface setting, or frame synchronization.

12. The method of claim 7 wherein one of the specific operations is received on the storage device, and corresponds to a normal data transmission defined by USB (Universal Serial Bus).

13. The system of claim 1 wherein the encryption/decryption module is further adapted to randomly generate the device key seed $S_d$ according to an occurrence time of one of the specific operations as obtained from a clock.

14. The method of claim 7, further comprising randomly generating the device key seed $S_d$ according to an occurrence time of one of the specific operations as obtained from a clock.

15. A tangible non-transitory computer-readable medium having stored thereon, computer-executable instructions that, if executed by a computing device, cause the computing device to perform a method comprising:
randomly generating a device key seed $S_d$ according a time interval between two specific operations on a storage device; and
applying the generated device key seed $S_d$ to data encryption of data D,
wherein the device key seed $S_d$ is said randomly generated in response to interrupts that notify the storage device of occurrence of the two specific operations.

16. The tangible computer-readable medium of claim 15 wherein the computer-executable instructions, if executed by the computing device, cause the computing device to perform the method that further comprises:
transmitting by the storage device the generated device key seed $S_d$ to a host;
receiving by the storage device from the host an encrypted host key seed $K_n(S_h)$, wherein $S_h$ is a host key seed generated by the host and $K_n$ is a first key generated by the host according to the device key seed $S_d$ transmitted by the storage device;
generating by the storage device the first key $K_n$ according to the device key seed $S_d$;

decrypting by the storage device the received encrypted host key seed $K_n(S_h)$ using the generated first key $K_n$ to obtain the host key seed $S_h$;

generating by the storage device a second key $K_{n+1}$ according to the obtained host key seed $S_h$ and the device key seed $S_d$; and encrypting by the storage device the data D using the generated second key $K_{n+1}$.

17. The tangible computer-readable medium of claim 16 wherein the computer-executable instructions, if executed by the computing device, cause the computing device to perform the method that further comprises:

transmitting by the storage device the encrypted data $K_{n+1}$(D to the host so as to enable the host to:
generate the second key $K_{n+1}$ according to the host key seed $S_h$ and the device key seed $S_d$ in the host; and
decrypt the encrypted data $K_{n+1}$(D) using the generated second key $K_{n+1}$ to obtain the data D.

18. A tangible computer-readable medium having stored thereon, computer-executable instructions that, if executed by a computing device, cause the computing device to perform a method comprising:

sending by a host a request for data D to a storage device, wherein the storage device randomly generates a device key seed $S_d$ according a time interval between two specific operations on the storage device;
receiving by the host the generated device key seed $S_d$;
generating by the host a host key seed $S_h$;
generating by the host a first key $K_n$ according to the received device key seed $S_d$;
encrypting by the host the host key seed $S_h$ using the generated first key $K_n$; and
transmitting by the host the encrypted host key seed $K_n(S_h)$ to the storage device to enable the storage device to:
generate the first key $K_n$ according to the device key seed $S_d$;
decrypt the transmitted encrypted host key seed $K_n(S_h)$ using the generated first key $K_n$ to obtain the host key seed $S_h$;
generate a second key $K_{n+1}$ according to the obtained host key seed $S_h$ and the device key seed $S_d$; and
encrypt the data D using the generated second key $K_{n+1}$ to obtain encrypted data $K_{n+1}$(D).

19. The tangible computer-readable medium of claim 18 wherein the computer-executable instructions, if executed by the computing device, cause the computing device to perform the method that further comprises:

receiving by the host the encrypted data $K_{n+1}$ (D);
generating by the host the second key $K_{n+1}$ according to the host key seed $S_h$ and the device key seed $S_d$; and
decrypting by the host the encrypted data $K_{n+1}$(D) using the generated second key $K_{n+1}$ to obtain the data D.

20. The tangible computer-readable medium of claim 18 wherein the device key seed $S_d$ is also randomly generated by the storage device according to an occurrence time of one of the specific operations as notified by an interrupt.

21. A host apparatus, comprising:

means for sending a request for data D to a storage device, wherein the storage device randomly generates a device key seed $S_d$ according a time interval between two specific operations on the storage device;
encryption/decryption means for:
receiving the generated device key seed $S_d$;
generating a host key seed $S_h$;
generating a first key $K_n$ according to the received device key seed $S_d$;
encrypting the host key seed $S_h$ using the generated first key $K_n$; and
transmitting the encrypted host key seed $K_n(S_h)$ to the storage device to enable the storage device to:
generate the first key $K_n$ according to the device key seed $S_d$;
decrypt the transmitted encrypted host key seed $K_n(S_h)$ using the generated first key $K_n$ to obtain the host key seed $S_h$;
generate a second key $K_{n+1}$ according to the obtained host key seed $S_h$ and the device key seed $S_d$; and
encrypt the data D using the generated second key $K_{n+1}$ to obtain encrypted data $K_{n+1}$(D).

22. The host apparatus of claim 21 wherein the encryption/decryption means further is for:

receiving the encrypted data $K_{n+1}$(D);
generating the second key $K_{n+1}$ according to the host key seed $S_h$ and the device key seed $S_d$; and
decrypting the encrypted data $K_{n+1}$(D) using the generated second key $K_{n+1}$ to obtain the data D.

23. The host apparatus of claim 21 wherein the device key seed $S_d$ is also randomly generated by the storage device according to an occurrence time of one of the specific operations as notified by an interrupt.

* * * * *